(12) United States Patent
Kono

(10) Patent No.: US 7,667,748 B2
(45) Date of Patent: Feb. 23, 2010

(54) METHOD AND APPARATUS OF DEFECTIVE PIXEL CORRECTION FOR A SOLID-STATE IMAGING DEVICE

(75) Inventor: Hirokazu Kono, Kodaira (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 459 days.

(21) Appl. No.: 11/554,242

(22) Filed: Oct. 30, 2006

(65) Prior Publication Data
US 2007/0097237 A1 May 3, 2007

(30) Foreign Application Priority Data
Oct. 31, 2005 (JP) .............................. 2005-315649

(51) Int. Cl.
*H04N 9/64* (2006.01)
*H04N 5/217* (2006.01)
*H04N 5/228* (2006.01)

(52) U.S. Cl. ...................... 348/246; 348/241; 348/222.1

(58) Field of Classification Search .................. 348/246
See application file for complete search history.

(56) References Cited

U.S. PATENT DOCUMENTS

| 6,002,433 | A | * | 12/1999 | Watanabe et al. | ............ 348/246 |
| 7,202,894 | B2 | * | 4/2007 | Kaplinsky et al. | ............ 348/246 |
| 2006/0126127 | A1 | * | 6/2006 | Stanback et al. | ............ 358/474 |

FOREIGN PATENT DOCUMENTS

JP 2003-78821 3/2003

* cited by examiner

*Primary Examiner*—Sinh Tran
*Assistant Examiner*—Jason Flohre
(74) *Attorney, Agent, or Firm*—Brundidge & Stanger, P.C.

(57) ABSTRACT

A defective pixel correction method and a defective pixel correction apparatus usable with an imaging device of the one-chip type including one color CCD. A video signal level of a pixel under consideration of a solid-state imaging device in which pixels respectively coated with mutually different color filters are disposed is compared with a signal level created from video signal levels of a plurality of peripheral pixels coated with color filters of a color of the pixel under consideration to thereby detect whether or not the pixel is defective. If the pixel is defective, the defective pixel is corrected according to a correction signal created using the video signal levels of the peripheral pixels.

15 Claims, 5 Drawing Sheets

| | | | | | | | | | | | |
|---|---|---|---|---|---|---|---|---|---|---|---|
| LINE 1 | B11 | G12 | B13 | G14 | B15 | G16 | B17 | G18 | · · · · | B(N-1)1 | G1M |
| LINE 2 | G21 | R22 | G23 | R24 | G25 | R26 | G27 | R28 | · · · · | G(N-1)2 | R2M |
| LINE 3 | B31 | G32 | B33 | G34 | B35 | G36 | B37 | G38 | · · · · | B(N-1)3 | G3M |
| LINE 4 | G41 | R42 | G43 | R44 | G45 | R46 | G47 | R48 | · · · · | G(N-1)4 | R4M |
| LINE 5 | B51 | G52 | B53 | G54 | B55 | G56 | B57 | G58 | · · · · | B(N-1)5 | G5M |
| LINE 6 | G61 | R62 | G63 | R64 | G65 | R66 | G67 | R68 | · · · · | G(N-1)6 | R6M |
| · · · · | · | · | · | · | · | · | · | · | · · · · · · | · | · |
| LINE N-1 | B(N-1)1 | G(N-1)2 | B(N-1)3 | G(N-1)4 | B(N-1)5 | G(N-1)6 | B(N-1)7 | G(N-1)8 | · · · · | B(N-1)(M-1) | G(N-1)M |
| LINE N | GN1 | RN2 | GN3 | RN4 | GN5 | RN6 | GN7 | RN8 | · · · · | GN(M-1) | RNM |

FIG. 4

| R22 | G23 (n1) | R24 | G25 (n3) | R26 |
|---|---|---|---|---|
| G32 | B33 | G34 (n0) | B35 | G36 |
| R42 | G43 (n2) | R44 | G45 (n4) | R46 |

FIG. 5

| G12 (m3) | B13 | G14 (m1) | B15 | G16 (m5) |
|---|---|---|---|---|
| R22 (n5) | G23 | R24 (n0) | G25 | R26 (n6) |
| G32 (m4) | B33 | G34 (m2) | B35 | G36 (m6) |

FIG. 6

| G21 (m3) | R22 | G23 (m1) | R24 | G25 (m5) |
|---|---|---|---|---|
| B31 (n5) | G32 | B33 (n0) | G34 | B35 (n6) |
| G41 (m4) | R42 | G43 (m2) | R44 | G45 (m6) |

FIG. 7

METHOD AND APPARATUS OF DEFECTIVE PIXEL CORRECTION FOR A SOLID-STATE IMAGING DEVICE

INCORPORATION BY REFERENCE

The present application claims priority from Japanese application JP2005-315649 filed on Oct. 31, 2005, the content of which is hereby incorporated by Reference into this application.

BACKGROUND OF THE INVENTION

The present invention relates to an imaging device of apparatuses such as a television camera, and in particular, to defective pixel detection and correction for color solid-state imaging devices, for example, a Charge Coupled Device (CCD) and a Complementary Metal Oxide Semiconductor (CMOS) device mounted on an imaging device of the one-chip type, though not limited thereto.

The color imaging devices employing CCDs include a color television camera of three chip type including a prism as a color decomposition optical system and three monochrome CCDs.

In the three-chip type color television camera, three primary colors, i.e., red (R), green (G), and blue (B) decomposed by the prism are processed by three CCDs. In the television camera, three monochrome CCDs are respectively employed for red, green, and blue. In the correction of defective pixels, a relationship between a video signal level of a pixel under consideration and video signal levels of pixels adjacent to the pertinent pixel is employed to determine whether or not the pixel is defective. The defective pixel correction is carried out according to the result of determination. For example, JP-A-2003-78821 and U.S. Pat. No. 6,950,133 describe the defective pixel detection and correction for a color television camera of three-chip type.

SUMMARY OF THE INVENTION

The prior art described above is associated with the defective pixel detection and correction for a color television camera of three chip type and hence cannot be utilized for a color television camera of one-chip type including one CCD in which pixels coated or covered with color filters are arranged.

The defects in the pixels of solid-state imaging devices include, for example, white noise, black noise, and nonuniformity in brightness. The defects change with a lapse of time depending on the environmental temperature, sensitivity (the amplification factor of an amplifier in a subsequent stage), exposure time, and aging. It is therefore required that each defective pixel is detected in a realtime fashion to correct the defective pixel on the realtime basis.

It is therefore an object of the present invention to provide a method of and an apparatus for correcting defective pixels in which a video signal outputted from a defective pixel of a color CCD is detected through a realtime operation to correct the defective pixel in a realtime fashion.

According to an aspect of the present invention, there is provided a defective pixel correction method for use with an imaging device having a solid-state imaging device including pixels respectively coated with mutually different color filters. The method includes the steps of detecting whether or not the first pixel is a defective pixel by comparing a video signal level of the first pixel of the solid-state imaging device with a signal level of a first judgment reference signal created from video signal levels of a plurality of peripheral pixels coated with color filters of a color of the first pixel and correcting, if the first pixel is a defective pixel, the video signal level of the defective pixel according to a defective pixel correction signal created using the video signal levels of the peripheral pixels.

In the defective pixel correction method, preferably, the first judgment reference signal is generated by obtaining a mean signal of at least two highest video signal levels selected from the video signal levels of the peripheral pixels and conducting for the mean signal an arithmetic operation $$a3 \times k1 + k2$$

where, $a3$ is the mean signal, $k1$ is a parameter to determine whether or not a difference between the video signal level of the first pixel and that of the mean signal is due to difference in contrast or due to a defective pixel, and $k2$ is a parameter to determine whether or not the difference between the video signal level of the first pixel and that of the mean signal $a3$ is due to noise or due to a defective pixel. The correction signal is the mean signal.

The defective pixel correction method preferably includes the step of selecting, from two pixels coated with a color filter of the same color as a second pixel coated with a color filter of a different color from the first pixel and are on the same line as and closest to the second pixel, a pixel having a video signal level higher than the other, the step of creating a second judgment reference signal using video signal levels of pixels above and below the pixel selected from the two pixels, video signal levels of pixels above and below the second pixel, and a video signal level of the pixel selected from the two pixels, the step of detecting whether or not the second pixel is a defective pixel by comparing a video signal level of the second judgment reference signal with a video signal level of the second pixel, and the step of correcting, if the second pixel is a defective pixel, the video signal level of the defective pixel using the video signal level of the pixel selected from the two pixels.

In the defective pixel correction method, preferably, the second judgment reference signal is calculated through an arithmetic operation $$j = d \times g \times k1 + k2$$

where, $d$ is the video signal level of the pixel selected from the two pixels, $g$ is a value derived from $(m1+m2)/(u+s)$, $m1$ and $m2$ are the video signal levels respectively of the pixels above and below the second pixel, $u$ and $s$ are the video signal levels respectively of the pixels above and below the signal selected from the two pixels, $k1$ is a parameter to determine whether or not difference between the video signal level of the second pixel and $d \times g$ calculated using the peripheral pixels is due to difference in contrast or due to a defective pixel, and $k2$ is a parameter to determine whether or not the difference between the video signal level of the second pixel and $d \times g$ is due to noise or due to a defective pixel.

According to another aspect of the present invention, there is provided a defective pixel correction apparatus for use with an imaging device having a solid-state imaging device including pixels respectively coated with mutually different color filters. The apparatus includes first detection means for detecting whether or not a first pixel is a defective pixel by comparing a video signal level of the first pixel of the solid-state imaging device with a signal level of a first judgment reference signal created from video signal levels of a plurality of peripheral pixels coated with color filters of a color of the first pixel and first correction means for correcting, if the first pixel is a defective pixel, the video signal level of the defective pixel according to a defective pixel correction signal created using the video signal levels of the peripheral pixels.

The defective pixel correction apparatus preferably includes means for selecting, from two pixels coated with a color filter of the same color as a second pixel coated with a color filter of different color from the first pixel and are on a same line as and are closest to the second pixel, a pixel having a video signal level higher than the other, means for creating a second judgment reference signal using video signal levels of pixels above and below the pixel selected from the two pixels, video signal levels of pixels above and below the second pixel, and a video signal level of the pixel selected from the two pixels, second detection means for detecting whether or not the second pixel is a defective pixel by comparing a video signal level of the second judgment reference signal with a video signal level of the second pixel, and second correction means for correcting, if the second pixel is a defective pixel, the video signal level of the defective pixel using the video signal level of the pixel selected from the two pixels.

Other objects, features and advantages of the invention will become apparent from the following description of the embodiments of the invention taken in conjunction with the accompanying drawings.

DESCRIPTION OF THE EMBODIMENTS

Figure 1:
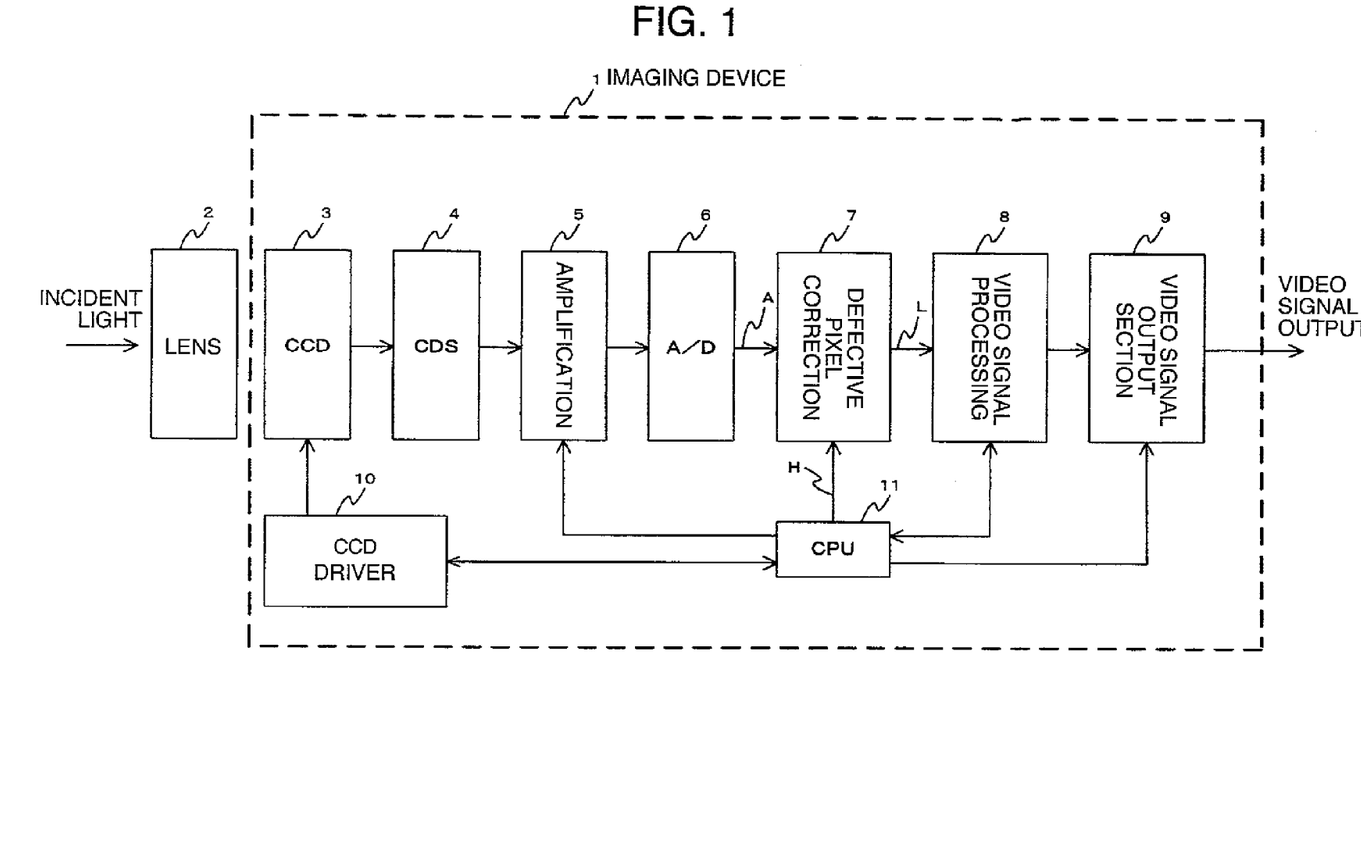
FIG. 1 is a block diagram showing an embodiment of an imaging device according to the present invention.
Figure 2:
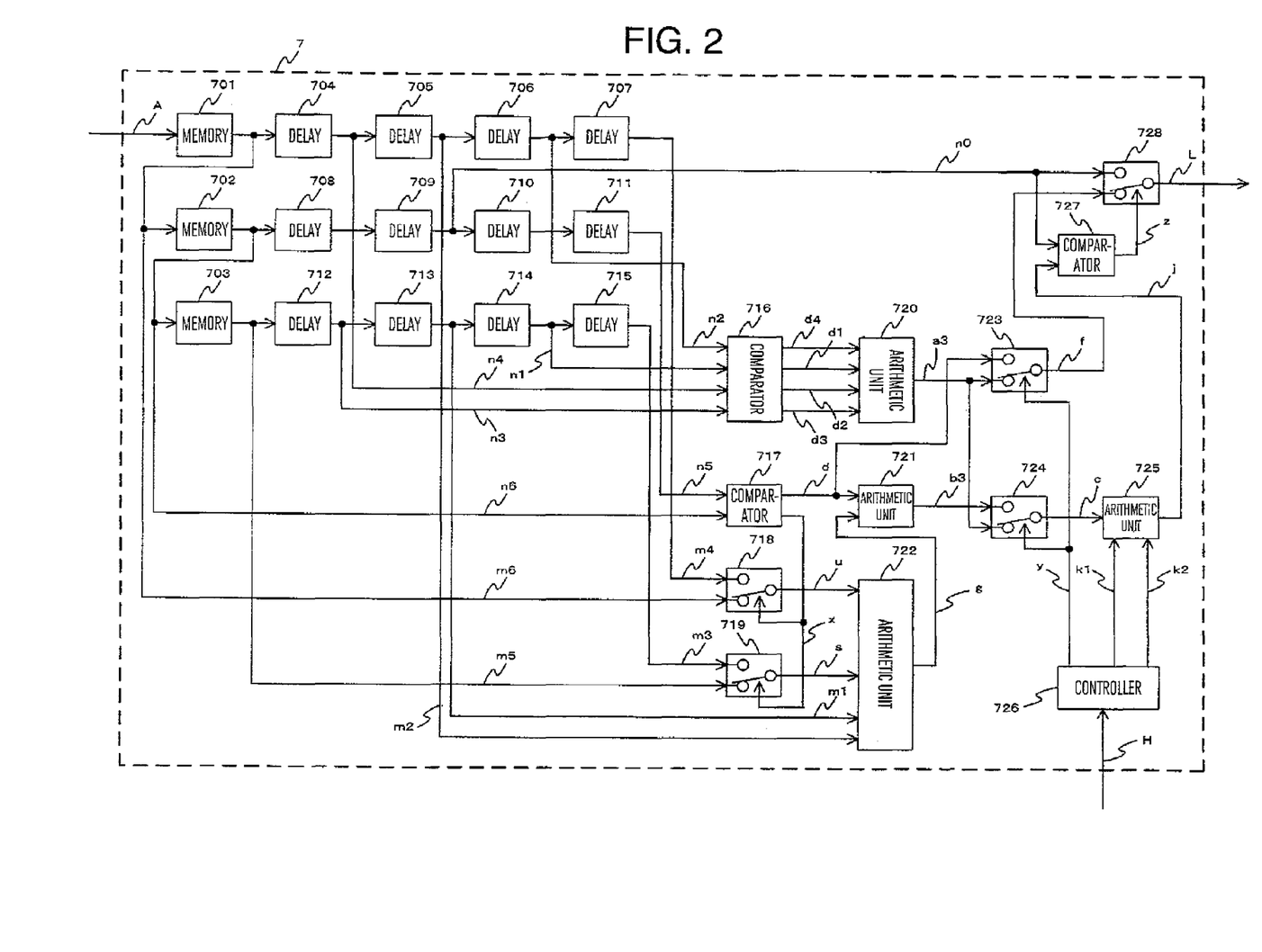
FIG. 2 is a block diagram showing a defective pixel correcting section of the embodiment.

Referring now to FIGS. 1 and 2, description will be given of an embodiment of the detection and correction of defective pixels (due to, e.g., white or black noise) in an imaging device of the one-chip type according to the present invention.

FIG. 1 shows an embodiment of the imaging device of the present invention. However, FIG. 1 shows only essential constituent components of the imaging device according to the present invention. For the other components, it is possible to use known devices and elements.

The configuration of FIG. 1 includes an imaging device 1, a lens section 2 to receive incident light and to focus an image, a CCD section 3 to convert the light from the lens section 2 into an electric signal, a Correlated Double Sampling (CDS) section 4 to remove noise from the signal from the CCD section 3, an amplifier section 5 to adjust a gain of the signal from the CDS section 4, an Analog to Digital (A/D) Converter 6 to convert the analog signal from the amplifier section 5 into a digital signal, i.e., signal A, a defective pixel correcting section 7 to detect and to correct a defective pixel of the CCD section 3, a video signal processor 8 to execute various image processing for signal L outputted from the defect pixel correcting section 7, a video signal output section 9 to convert the signal from the video signal processor 8 into a video signal of a predetermined scheme and to output the video signal therefrom, a CCD driver 10 to drive the CCD section 3, and a Central Processing Unit (CPU) 11 to control the constituent components of the imaging device 1. The CPU 11 controls the defective pixel correcting section 7 using signal H.

The video signal of a predetermined scheme outputted from the video signal output section 9 is a signal of a mobile or still image prescribed by, for example, the National Television System Committee (NTSC), the Phase Alternating by Line (PAL) standard, or the High Definition TeleVision standard.

FIG. 2 shows details of the defective pixel correcting section 7 in a block diagram.

In FIG. 2, numerals 701 to 703 indicate memory sections to provide a delay in time of one scanning line (1H). Numerals 704 to 715 are delay sections to provide a delay in time of one pixel. The memories 701 to 703 output signals m6, n6, and m5, respectively. The delays 704 to 707 output signals n4, m2, n2, and m4, respectively. The delay 709 outputs a signals n0. The delays 711 to 715 output signals n5, n3, m1, n1, and m3, respectively. A numeral 716 indicates a comparator to compare signal levels of the signals n1 to n4 with each other to output two higher-level signals as signals d1 and d2. A numeral 720 is an arithmetic section to conduct an arithmetic operation for the signals d1 and d2 to output a signal a3. A numeral 717 is a comparator to compare signal levels of the signals n5 and n6 with each other to output the higher-level as a signal d. Numerals 718 and 719 are switch sections each of which conducts a changeover operation between signals to be outputted according to the comparison result of the comparator 717. A numeral 722 indicates an arithmetic section to conduct an arithmetic operation for signals d and g as well as signals u and s respectively from the switches 718 and 719 to output a signal g. A numeral 721 is an arithmetic section to conduct an arithmetic operation for the signals d and g to output a signal b3 and numerals 723 and 724 indicate switch sections each of which conducts a changeover operation between signals to be outputted according to an discrimination signal y indicating whether or not a pixel under consideration is green. A numeral 725 indicates an arithmetic section to conduct an arithmetic operation for a signal c from the switch 724 and signals k1 and k2 from a controller 726. A numeral 727 is a comparator to compare the signal n0 with a signal j to output a signal z and a numeral 728 is a switch to conduct a changeover operation between the signals n0 and j according to the signal z. The controller 726 outputs the discrimination signal y and the signals k1 and k2 according to a signal H inputted thereto.

Although the memory section 701 provides a delay in time of one scanning line (1H) in the embodiment, the same operation as above operation is conducted even if the memory section 701 is not provided. Also, the memory section 701 may be employed to adjust timing (synchronization) of the entire operation of the imaging device 1.

Referring now to FIG. 1, description will be given of operation of the first embodiment according to the present invention.

The CCD 3 of the imaging device 1 receives a focused image of light from the lens section 2, converts the image through an photoelectric conversion into an electric signal, and outputs the signal to the CDS 4. The CDS 4 removes noise from the signal and outputs the resultant signal to the amplifier section 5. The amplifier section 5 amplifies the signal according to a gain control signal from the CPU 11 and outputs the obtained signal to the A/D converter 6. The A/D converter 6 converts an analog signal from the amplifier section 5 into a digital signal of, for example, ten bits and outputs a resultant signal A to the defective pixel correcting section 7. The correcting section 7 detects and corrects a defective pixel of the CCD 3 and outputs a signal L to the video signal processor 8. The processor 8 executes various image processing for the signal L from the defective pixel correcting section 7 and outputs the resultant signal to the video signal output section 9. The output section 9 converts the signal from the processor 8 into a video signal of a predetermined scheme and outputs the obtained signal therefrom. The CCD driver 10 outputs a signal to drive the CCD 3 according to a control signal from the CPU 11. The CPU 11 outputs a signal H to control the defective pixel correcting section 7.

The CCD driver 10 transmits, to the CPU 11, color information of a video signal from the CCD 3. Or, it is also possible that the CPU 11 indicates the CCD driver 10 a readout start point of the video signal to be outputted from the CCD 3. The discrimination signal y indicates color information of a pixel. Color information of a video signal from the CCD 3 is superimposed onto the signal H from the CPU 11 and the resultant signal is transmitted to the controller 726. Resultantly, the controller 726 outputs the discrimination signal y which is color information of the pixel.

Next, referring to FIGS. 2 to 6, description will be given of the operation to detect and to correct a defective pixel of the CCD 3 in the embodiment of the present invention.

Figure 3:
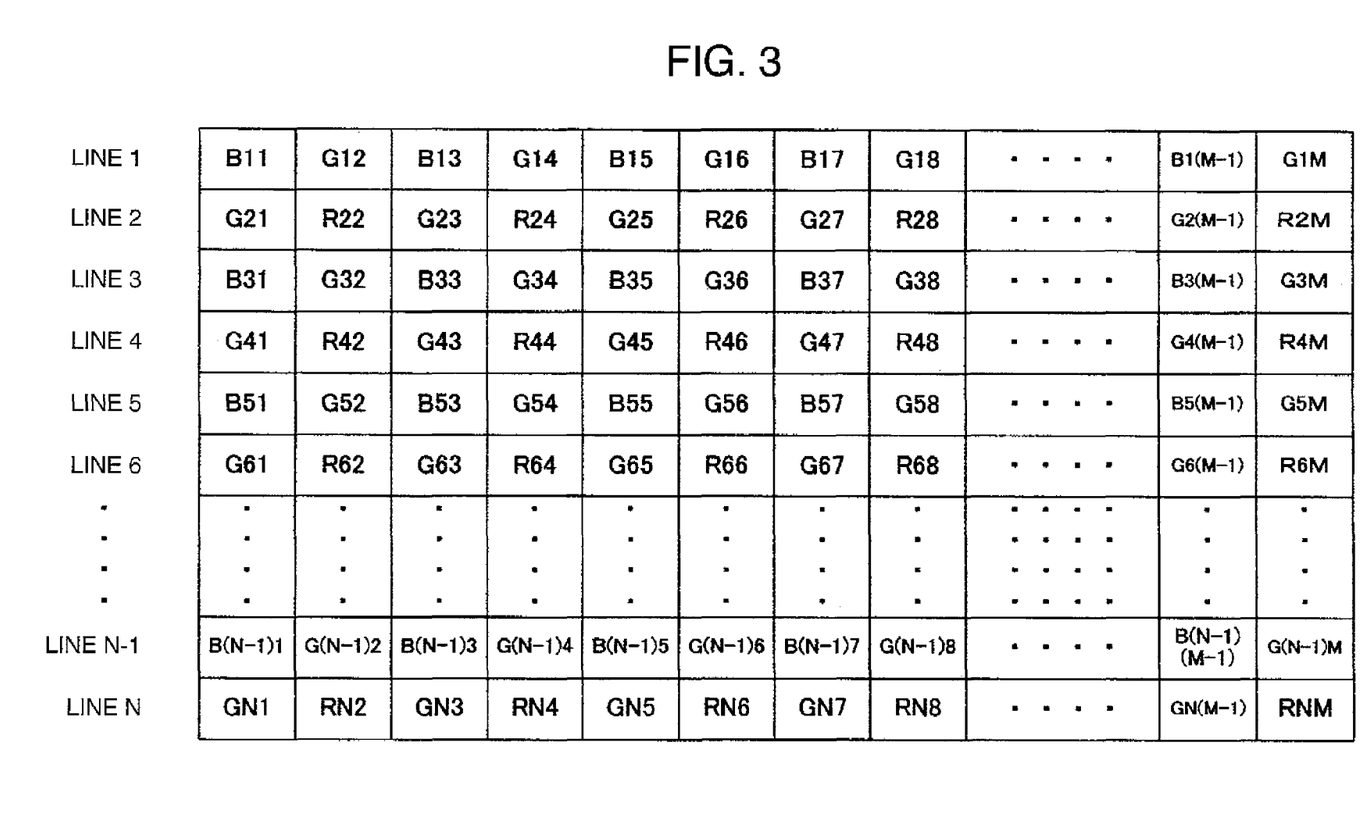
FIG. 3 is a table for explaining an array of a color CCD of the one-chip type.
Figure 4:
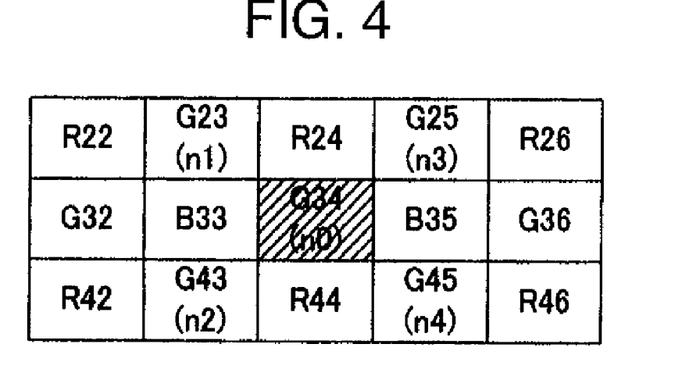
FIG. 4 is a table for explaining detection and correction of a defective pixel for a green signal according to the embodiment.
Figure 5:
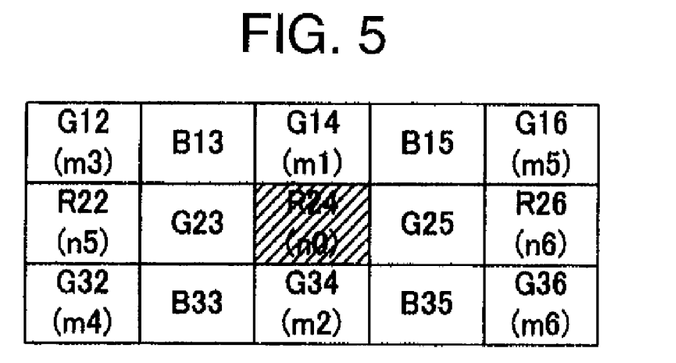
FIG. 5 is a table for explaining detection and correction of a defective pixel for a red signal according to the embodiment.
Figure 6:
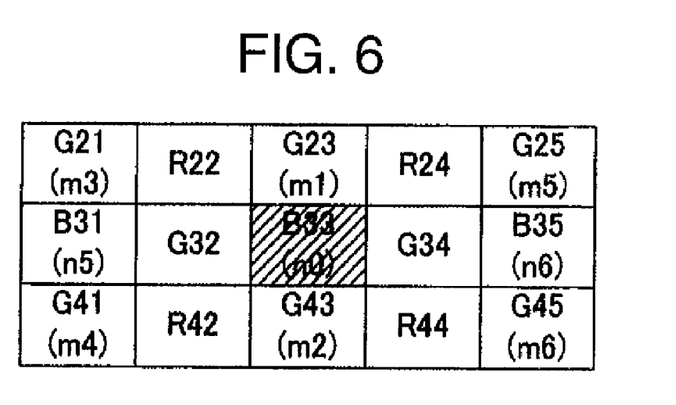
FIG. 6 is a table for explaining detection and correction of a defective pixel for a blue signal according to the embodiment.

FIG. 3 shows an array of color filters of a color CCD of the one-chip type. FIG. 4 is a table to explain the operation to detect and to correct a defective pixel for a green (G) signal in the embodiment. FIG. 5 is a table to explain the operation to detect and to correct a defective pixel for a red (R) signal in the embodiment. FIG. 6 is a table to explain the operation to detect and to correct a defective pixel for a blue (B) signal in the embodiment.

In the pixel array of the color CCD shown in FIG. 3, each square or frame indicates one pixel, and letters R, G, and B in associated squares indicate colors of the pixels. Specifically, R, G, and B indicate pixels coated respectively with red, green, and blue filters. The pixel with the red filter conducts a photoelectric conversion for red light filtered by the red filter. The pixel with the green filter carries out a photoelectric conversion for green light passed through the green filter. The pixel with the blue filter conducts a photoelectric conversion for blue light filtered by the blue filter. The numeral in the square indicates a position in the array, and the digit of tens indicates the row and that of units indicates the column. The pixel array of the embodiment includes a first line "B11, G12, B13, G14, B15, G16, B17, G18, . . . , B1(M−1), G1M; a second line "G21, R22, G23, R24, G25, R26, G27, R28, . . . , G2(M−1), R2M; a line N−1"B(N−1)1, G(N−1)2, B(N−1)3, G(N−1)4, B(N−1)5, G(N−1)6, B(N−1)7, G(N−1)8, . . . , B(N−1)(M−1), G(N−1)M; and line N "GN1, RN2, GN3, RN4, GN5, RN6, GN7, RN8, . . . , GN(M−1), RNM. Letters M and N are natural numbers. The pixels to read video signals therefrom are ordered in almost the same sequence as for the CCD pixels described above. In other words, the video signals are read therefrom in a sequence of, for example, B11, G12, B13, . . . , GN(M−1), RNM.

According to the present invention, it is possible to conduct realtime detection and correction of defects in all pixels. However, for simplification of description, one pixel will be representatively described as a target pixel for each color.

First, description will be given of the detection and correction of defects in green pixels using G34 of FIG. 3 as a target pixel. Processing is similarly executed also for red and blue pixels.

Assume as shown in FIG. 4 that the pixels G34, G23, G43, G25, and G45 output video signals n0 to n4, respectively.

The signal A is set or adjusted, by use of the three memories 701 to 703 and the 12 delay sections 704 to 715 of FIG. 2, to one and the same point of timing so that arithmetic processing, comparison, and the like are conducted for the video signal data of pixels shown in FIG. 4 (the operation is referred to as "setting or adjusting of a signal to the same time hereinbelow"). It is assumed in the description of the embodiment, no delay time exists in the arithmetic operation and the comparison in the range from the comparator 716 to the switch 728.

Subsequently, for the signal n0 of FIG. 4, the comparator 716 of FIG. 2 compares with each other the signal levels of the four signals n1 to n4 of the color pixels having the mutually same color and being adjacent to the signal n0 in the inclined directions and outputs two higher-level signals as signals d1 and d2 to the arithmetic section 720. The arithmetic section 720 conducts an arithmetic operation for the signals d1 and d2 to produce a signal a3 and outputs the signal a3 to the switch sections 723 and 724. The signal (defective pixel correction signal) a3 is derived from the following expression.

$$a3=(d1+d2)/2 \tag{1}$$

In this regard, to obtain the signal a3, the comparator 716 compares the signal levels respectively of the signals n1 to n4 with each other to select therefrom two higher-level signals. However, three or four higher-level signals may be selected for the same purpose.

To select three higher-level signals from the signals n1 to n4 to attain the signal a3, the comparator 716 of FIG. 2 compares the signal levels of the signals n1 to n4 with each other to output three higher-level signals as signals d1 o d3 to the arithmetic section 720. The arithmetic section 720 carries out an arithmetic operation according to a predetermined expression to obtain the signal a3 and outputs the signal a3 to the switch sections 723 and 724. The expression used to derive the signal a3 is as follows.

$$a3=(d1+d2+d3)/3 \tag{1'}$$

In the operation to acquire the signal a3 from the four signals n1 to n4, although the signals n1 to n4 are inputted to the comparator 716, the comparator 716 does not conduct the comparison between the signals n1 to n4. That is, the signals n1 to n4 are outputted as signals d1 to d4 to the arithmetic section 720. The arithmetic section 720 conducts an arithmetic operation according to a predetermined expression to attain the signal a3 and outputs the signal a3 to the switch sections 723 and 724. The predetermined expression to derive the signal a3 is as below.

$$a3=(d1+d2+d3+d3)/4 \tag{1''}$$

Since the target pixel is a green pixel, the switch sections 723 and 724 output the signal a3 therefrom. The witch sections 723 and 724 conduct the changeover operation according to the discrimination signal y from the controller 726. The signal a3 from the switch section 723 is outputted as a signal f to the switch section 728. The switch section 724 outputs the signal a3 as a signal c to the arithmetic section 725. The arithmetic section 725 conducts an arithmetic operation for the signal c from the switch section 724 and the signals k1 and k2 from the controller 726 to attain a signal j and outputs the signal j to the comparator 727. The signal (judgment reference signal) j is obtained from the following expression.

$$j = c \times k1 + k2 \quad (2)$$

The CPU 11 inputs parameters k1 and k2 via the controller 726 to the arithmetic unit 725.

The parameter k1 is a parameter to determine whether or not the difference between the signal n0 of the target pixel and the signal c calculated from the peripheral pixels is due to difference in contrast or due to a defective pixel. The parameter k2 is a parameter to determine whether or not the difference between the signal n0 and the signal c is due to noise or due to a defective pixel. The parameters k1 and k2 may be adaptively changed depending on the gain of the amplifier section 5 and the color of the target pixel. The arithmetic section 725 may hold the parameters k1 and k2 until the values thereof are changed.

The comparator 727 compares the signal levels of the signals n1 and j with each other and outputs the comparison result as a signal z to the switch section 728. If the signal n0 is higher in the signal level than the signal j, the switch section 728 assumes that the target pixel G34 is defective and hence outputs the signal f as a signal L therefrom. The signal f is a defective pixel correction signal. As a result of the signal level comparison, if the signal n0 is equal to or less than the signal j, it is assumed that the target pixel G34 is not defective and hence the switch section 728 outputs the signal n0 as the signal L therefrom.

Next, description will be given of the detection and correction of defects in red pixels using R24 of FIG. 3 as a target pixel.

Assume as shown in FIG. 5 that the pixels R24, R22, and R26 output video signals n0, n5, and n6, respectively. Assume that G12, G14, G16, G32, G34, and G36 outputs video signals m3, m1, m5, m4, m2, and m6, respectively.

First, by use of the three memories 701 to 703 and the 12 delay sections 704 to 715 of FIG. 2, the video signal data of pixels of FIG. 5 associated with the signal A is adjusted to the same time.

For the signal n0 of FIG. 5, the comparator 717 of FIG. 2 compares with each other the signal levels of the two signals n5 and n6 of the color pixels having the mutually same color and being adjacent to the signal n0 in the horizontal direction and then outputs the higher-level signal as a signal d to the switch section 723 and the arithmetic section 721.

According to the comparison result from the comparator 717, if the signal n5 is more than the signal n6, a signal x from the comparator 717 is used to control the switch sections 718 and 719. The switch section 718 outputs the signal m4 as a signal u to the arithmetic section 722. The switch section 719 outputs the signal m3 as a signal s to the arithmetic section 722.

If the signal n6 is more than the signal n5 as a result of the comparison by the comparator 717, the signal x from the comparator 717 is used to control the switch sections 718 and 719. The switch section 718 outputs the signal m6 as a signal u to the arithmetic section 722. The switch section 719 outputs the signal m5 as a signal s to the arithmetic section 722.

The arithmetic section 722 conducts an arithmetic operation for the signals u, s, m1 and m2 to produce a signal g and outputs the signal g to the arithmetic section 721. The signal g is derived from the following expression.

$$g = (m1 + m2)/(u + s) \quad (3)$$

The arithmetic section 721 carries out an arithmetic operation for the signals d and g to obtain a signal b3 and outputs the signal b3 to the switch section 724. The signal b3 is calculated by use of the following expression.

$$b3 = d \times g \quad (4)$$

Since the target pixel is other than a green pixel, the switch section 723 outputs the signal d as a signal f to the switch section 728. Similarly, the switch section 724 outputs the signal b3 as a signal c to the switch section 725. The discrimination signal y from the controller 726 is used to control the changeover operation of the switch sections 723 and the 724. The arithmetic section 725 conducts an arithmetic operation for the signal c from the switch section 724 and the signals k1 and k2 from the controller 726 to attain a signal j and outputs the signal j to the comparator 727. The CPU 11 delivers the signals k1 and k2 via the controller 726 to the arithmetic section 725. The signal j is derived from expression (2) described above.

The comparator 727 compares the signal levels of the signals n0 and j with each other. The comparison result of the comparator 727 is outputted as a signal z to the switch section 728. As a result of the comparison in the comparator 727, if the signal n0 is higher in the signal level than the signal j, the switch section 728 assumes that the target pixel R24 is defective and hence outputs the signal f as the signal L. The signal f is a defective pixel correction signal. If the signal n0 is equal to or less than the signal j as a result of the signal level comparison, it is assumed that the target pixel R24 is not defective and the switch section 728 outputs the signal n0 as the signal L.

Description will now be given of the detection and correction of defects in blue pixels using B33 of FIG. 3 as a target pixel. The defective pixel detection and correction for the blue pixels is similar to the operation to detect and to correct defective red pixels.

Assume as shown in FIG. 6 that the pixels B33, B31, and B35 output video signals n0, n5, and n6, respectively. Assume that G21, G23, G25, G41, G43, and G45 outputs video signals m3, m1, m5, m4, m2, and m6, respectively.

First, by using the three memories 701 to 703 and the 12 delay sections 704 to 715 of FIG. 2, the video signal data of pixels of FIG. 6 associated with the signal A is adjusted to the same time.

For the signal n0 of FIG. 6, the comparator 717 of FIG. 2 compares with each other the signal levels of the two signals n5 and n6 of the color pixels having the mutually same color and being adjacent to the signal n0 in the horizontal direction and then outputs the higher-level signal as a signal d to the switch section 723 and the arithmetic section 721.

If the signal n5 is more than the signal n6 as a result of comparison in the comparator 717, the signal x from the comparator 717 is used to control the switch sections 718 and 719. The switch section 718 outputs the signal m4 as the signal u to the arithmetic section 722. The switch section 719 outputs the signal m3 as the signal S to the arithmetic section 722.

If the signal n6 is more than the signal n5 as a result of the comparison, the signal x from the comparator 717 is used to control the switch sections 718 and 719. The switch section 718 outputs the signal m6 as the signal u to the arithmetic section 722. The switch section 719 outputs the signal m5 as the signal 5 to the arithmetic section 722.

The arithmetic section 722 conducts an arithmetic operation for the signals u, s, m1 and m2 to attain a signal g and then outputs the signal g to the arithmetic section 721. The. signal g is derived from expression (3) described above.

The arithmetic section 721 carries out an arithmetic operation for the signals d and g to obtain a signal b3 and outputs the signal b3 to the switch section 724. The signal b3 is obtained using expression (4) described above.

Since the target pixel is other than a green pixel, the switch section 723 outputs the signal d as the signal f to the switch section 728. Similarly, the switch section 724 outputs the signal b3 as the signal c to the switch section 725. The discrimination signal y from the controller 726 is employed to control the changeover operation of the switch sections 723 and the 724. The arithmetic section 725 conducts an arithmetic operation for the signal c from the switch section 724 and the signals k1 and k2 from the controller 726 to attain a signal j and outputs the signal j to the comparator 727. The CPU 11 delivers the signals k1 and k2 via the controller 726 to the arithmetic section 725. The signal j is obtained by use of expression (2) described above.

The comparator 727 compares the signal levels of the signals n0 and j with each other. The comparison result of the comparator 727 is delivered as a signal z to the switch section 728. As a result of the comparison in the comparator 727, if the signal n0 is higher in the signal level than the signal j, the switch section 728 assumes that the target pixel B33 is defective and hence outputs the signal f as the signal L. The signal f is a defective pixel correction signal. If the signal n0 is equal to or less than the signal j as a result of the signal level comparison, it is assumed that the target pixel B33 is not defective and the switch section 728 outputs the signal n0 as the signal L.

The defective pixel correcting section 7 of FIG. 2 may be implemented in various forms. For example, the section 7 may be software applications or modules, hardware devices such as programmable and/or memory chips or any other suitable combination thereof.

Next, description will be given of another embodiment of the present invention.

Figure 7:
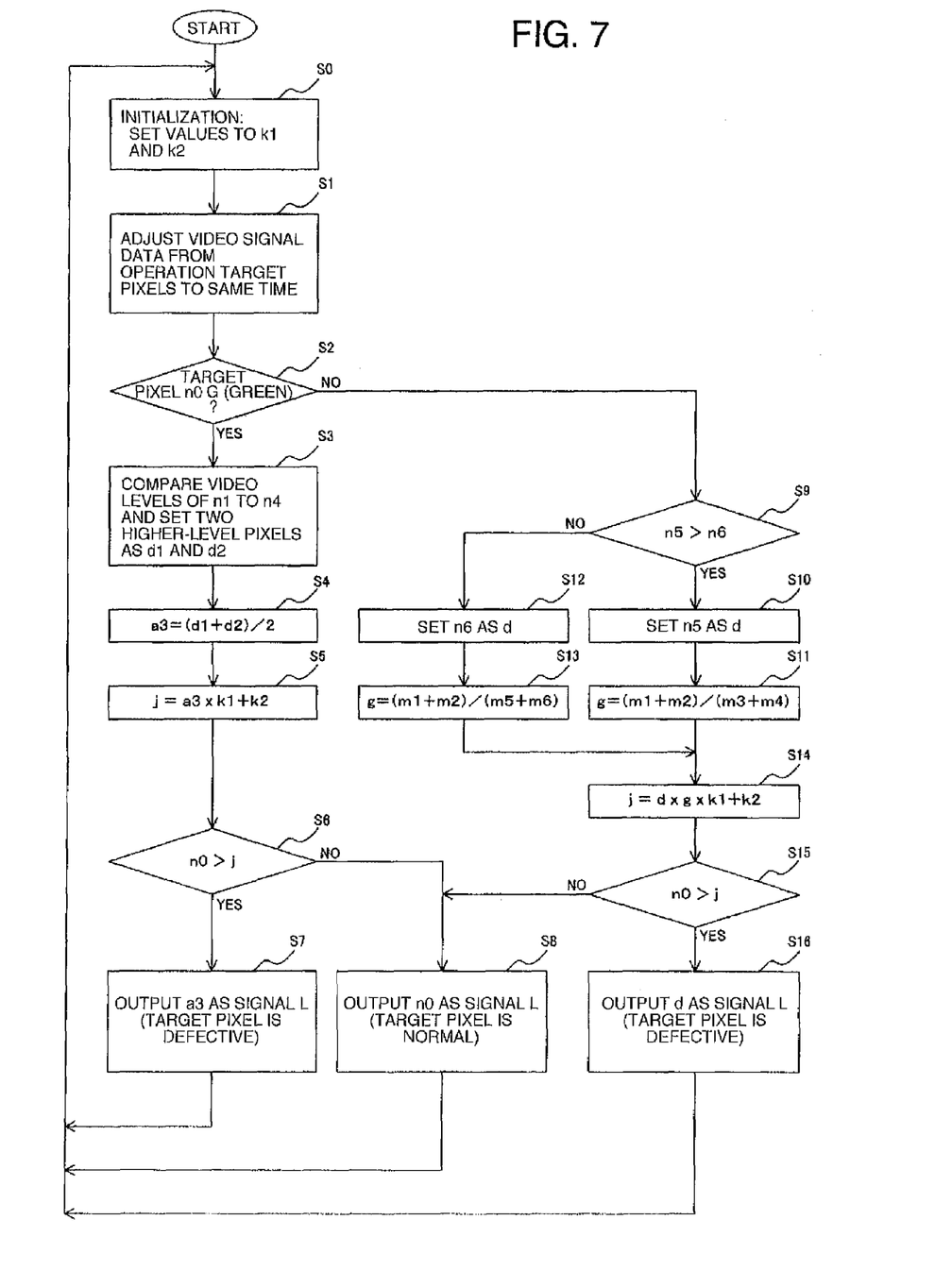
FIG. 7 is a flowchart for explaining operation to detect and to correct a defective pixel in another embodiment of the present invention.

The flowchart of FIG. 7 shows the embodiment of operation to detect and to correct defective pixels. In the embodiment, the defective pixel correcting section 7 shown in FIG. 1 is implemented using a computer such as a CPU to conduct the defective pixel detection and correction in a solid-state imaging device in a realtime fashion. The operation will be described by referring to FIGS. 4 and 5.

For the signal A inputted to the defective pixel correcting section 7, the arithmetic processing is executed beginning at "start" of the flowchart of FIG. 7. In the initialization in step S0, numeric values are set to k1 and k2. In step S1, video signal data outputted from target pixels for the arithmetic operation is adjusted to the same time. In an example of implementation of the adjusting operation, the data is delayed in time by use of a Random Access Memory (RAM).

In step S2, a check is made to determine whether or not the target pixel n0 for the defective pixel detection is green. The determination is conducted using a signal such as the discrimination signal y including pixel color information. If the pixel n0 is green, control goes to step S3; otherwise, control goes to step S9. In step S3, for the signal n0 of FIG. 4, the signal levels of the four signals n1 to n4 of the color pixels having the mutually same color and being adjacent to the signal n0 in the inclined directions are compared with each other. Two higher-level signals are selected as signals d1 and d2. In step S4, the signal a3 is calculated and then control goes to step S5. The signal a3 is derived from the following expression.

$$a3=(d1+d2)/2 \quad (5)$$

In step S5, the signal j (judge reference signal level) is calculated, and control goes to step S6. The signal j is calculated as below.

$$j=a3 \times k1 + K2 \quad (6)$$

In step 6, a check is made to determine whether or not the target pixel n0 is a defective pixel. The signal levels of the signals n0 and j are compared with each other. If the signal n0 is higher than the signal j as a result, it is assumed that the pixel n0 is defective and control goes to step S7. If the signal n0 is equal to or lower than the signal j, it is assumed that the pixel n0 is normal and control goes to step S8. In step S7, the signal a3 is outputted as the signal L. In step S8, the signal n0 is outputted as the signal L.

If the target pixel n0 is other than green in step 2, control goes to step S9. In the embodiment, the color other than green is red or blue.

In step S9, for the signal n0 of FIG. 5 or 6, the signal levels of the two signals n5 and n6 of the color pixels having the mutually same color and being next to the signal n0 in the horizontal direction are compared with each other. If the signal n5 is more than the signal n6, control goes to step S10; otherwise, control goes to step S12.

In step 10, the signal n5 is set as a signal d and control goes to step S11. In step S11, a signal g is calculated and control goes to step S14. The signal g is calculated as below.

$$g=(m1+m2)/(m3+m4) \quad (7)$$

In step S14, a signal j (judgment reference signal level) is calculated and then control goes to step S15. The signal j is derived as follows.

$$j=d \times g \times k1 + k2 \quad (8)$$

In step S15, a check is made to determine whether or not the target pixel n0 is defective. The signal levels of the signals n0 and j are compared with each other. If the signal n0 is more than the signal j, the target pixel n0 is regarded as defective, and control goes to step S16. Otherwise, the target pixel n0 is regarded as normal, and control goes to step S8. In step S16, the signal d is outputted as the signal L. In step S8, the signal n0 is outputted as the signal L.

In step S12, the signal n6 is set as the signal d, and control goes to step S13. In step S13, the signal g is calculated as below.

$$g=(m1+m2)/(m5+m6) \quad (9)$$

In step S14, the signal j is derived from expression (8) and then control goes to step S15. In step S15, a check is made to determine whether or not the target pixel n0 is a defective pixel. The signal levels of the signals n0 and j are compared with each other. If the signal n0 is more than the signal j, the target pixel n0 is regarded as defective, and control goes to step S16. Otherwise, the target pixel n0 is regarded as a normal pixel, and control goes to step S8. In step S16, the signal d is outputted as the signal L. In step S8, the signal n0 is outputted as the signal L.

Next, description will be given of an example of implementation to determine the values of k1 and k2.

The parameter k1 is a parameter to determine, primarily in a situation in which the associated signals are at a high signal level (high luminance), whether or not the difference between the signal n0 of the target pixel detected as a defective pixel and the signal a3 or (d×g), i.e., the signal c in FIG. 2, calculated from the peripheral pixels of the signal n0 is due to difference in contrast or due to a defective pixel. If the value of k1 is, for example, 1.1 and the difference of the value of k1 relative to the value calculated for the signal a3 or (d×g) using the peripheral pixels is 10% or less, the difference is regarded as contrast difference. This means that if the difference is equal to or less than 10%, the target pixel is a normal pixel.

The parameter k2 is a parameter to determine, for the low signal level (low luminance) whether or not the difference between the signal n0 and the signal a3 or (d×g) is due to noise or due to a defective pixel. For example, if the rated level of 100% is expressed as 500 using a 10-bit digital value (the maximum value is 1023) and the value of k2 is set to about 10, a variation of about 2% is regarded as noise. In other words, if the variation is equal to or less than about 2%, the target pixel is a normal pixel. It is possible to adaptively change the parameters k1 and k2 depending on the gain of the amplifier section 5 and the color of the target pixel.

In the description of the embodiments, the imaging device includes filters of three colors red, green, and blue, but the present invention is not restricted by the imaging device. It is to be appreciated that the present invention is broadly applicable to other imaging devices such as a digital still camera.

According to the embodiments, by use of the correlation between the pixel under consideration which is subjected to defect detection and adjacent pixels having a color of the pixel under consideration and/or pixels having a color different from the pixel under consideration, the defective pixels of the imaging device of single plate type can be detected in a realtime fashion and hence the defective pixel correction can be satisfactorily carried out through an online operation.

Although the description has been given of the embodiments including an imaging device of the one-chip type, it is also possible to apply the defective pixel detection and correction of the present invention to an imaging device of plural-chip type including a plurality of color CCD imaging elements.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A defective pixel correction method for use with an imaging device having a solid-state imaging device including a plurality of pixels respectively coated with mutually different color filters, comprising the steps of:
   detecting whether or not a first pixel is a defective pixel by comparing a video signal level of the first pixel of the solid-state imaging device with a signal level of a first judgment reference signal created from video signal levels of a plurality of peripheral pixels coated with color filters of a color of the first pixel;
   correcting, if the first pixel is a defective pixel, the video signal level of the defective pixel according to a defective pixel correction signal created using the video signal levels of the peripheral pixels;
   selecting, from two pixels coated with a color filter of a same color as a second pixel coated with a color filter of a different color from said first pixel and are on the same line as and closest to the second pixel, a pixel having a higher video signal level than the other;
   creating a second judgment reference signal using video signal levels of pixels above and below the pixel selected from the two pixels, video signal levels of pixels above and below the second pixel, and a video signal level of the pixel selected from the two pixels;
   detecting whether or not the second pixel is a defective pixel by comparing a video signal level of the second judgment reference signal with a video signal level of the second pixel; and
   correcting, if the second pixel is a defective pixel, a video signal level of the defective pixel using the video signal level of the pixel selected from the two pixels.

2. A defective pixel correction method for use with an imaging device having a solid-state imaging device including a plurality of pixels respectively coated with mutually different color filters, comprising the steps of:
   detecting whether or not a first pixel is a defective pixel by comparing a video signal level of the first pixel of the solid-state imaging device with a signal level of a first judgment reference signal created from video signal levels of a plurality of peripheral pixels coated with color filters of a color of the first pixel;
   correcting, if the first pixel is a defective pixel, the video signal level of the defective pixel according to a defective pixel correction signal created using the video signal levels of the peripheral pixels,
   wherein the first judgment reference signal is generated by obtaining a mean signal of at least two highest video signal levels selected from the video signal levels of the peripheral pixels and conducting for the mean signal an arithmetic operation $$a3 \times k1 + k2,$$

where, a3 is the mean signal, k1 is a parameter to determine whether or not a difference between the video signal level of the first pixel and that of the mean signal a3 is due to difference in contrast or due to a defective pixel, and k2 is a parameter to determine whether or not the difference between the video signal level of the first pixel and that of the mean signal a3 is due to noise or due to a defective pixel, the defective pixel correction signal being the mean signal a3.

3. A defective pixel correction method according to claim 2, wherein the mean signal a3 is created by taking a mean of three highest video signal levels selected from the video signal levels of the peripheral pixels.

4. A defective pixel correction method according to claim 2, wherein the mean signal a3 is created by taking a mean of four video signal levels of the peripheral pixels.

5. A defective pixel correction method according to claim 1, wherein the second judgment reference signal is calculated through an arithmetic operation $$j = d \times g \times k1 + k2$$

where, d is the video signal level of the pixel selected from the two pixels, g is a value derived from (m1+m2)/(u+s), m1 and m2 are the video signal levels respectively of the pixels above and below the second pixel, u and s are the video signal levels respectively of the pixels above and below the signal selected from the two pixels, k1 is a parameter to determine whether or not a difference between the video signal level of the second pixel and the video signal level d×g calculated using the peripheral pixels is due to difference in contrast or due to a defective pixel, and k2 is a parameter to determine whether or not the difference between the video signal level of the second pixel and the video signal level d×g is due to noise or due to a defective pixel.

6. A defective pixel correction apparatus for use with an imaging device having a solid-state imaging device including a plurality of pixels respectively coated with mutually different color filters, comprising:
   first detection means for detecting whether or not a first pixel is a defective pixel by comparing a video signal level of the first pixel of the solid-state imaging device with a signal level of a first judgment reference signal created from video signal levels of a plurality of peripheral pixels coated with color filters of a color of the first pixel;
   first correction means for correcting, if the first pixel is a defective pixel, the video signal level of the defective pixel according to a defective pixel correction signal created using the video signal levels of the peripheral pixels;

means for selecting, of two pixels coated with a color filter of a same color as a second pixel coated with a color filter of different color from the first pixel and are on the same line as and closest to the second pixel, a pixel having a video signal level higher than the other;

means for creating a second judgment reference signal using video signal levels of pixels above and below the pixel selected from the two pixels, video signal levels of pixels above and below the second pixel, and a video signal level of the pixel selected from the two pixels;

second detection means for detecting whether or not the second pixel is a defective pixel by comparing a video signal level of the second judgment reference signal with a video signal level of the second pixel; and second correction means for correcting, if the second pixel is a defective pixel, the video signal level of the defective pixel using the video signal level of the pixel selected from the two pixels.

7. A defective pixel correction apparatus for use with an imaging device having a solid-state imaging device including a plurality of pixels respectively coated with mutually different color filters, comprising:

first detection means for detecting whether or not a first pixel is a defective pixel by comparing a video signal level of the first pixel of the solid-state imaging device with a signal level of a first judgment reference signal created from video signal levels of a plurality of peripheral pixels coated with color filters of a color of the first pixel;

first correction means for correcting, if the first pixel is a defective pixel, the video signal level of the defective pixel according to a defective pixel correction signal created using the video signal levels of the peripheral pixels;

means for creating a mean signal by taking a mean of at least two highest video signal levels selected from the video signal levels of the peripheral pixels;

arithmetic means for conducting for the mean signal an arithmetic operation $$a3 \times k1 + k2,$$

to create the first judge reference signal, where a3 is the mean signal, k1 is a parameter to determine whether or not a difference between the video signal level of the first pixel and that of the mean signal a3 is due to difference in contrast or due to a defective pixel, and k2 is a parameter to determine whether or not the difference between the video signal level of the first pixel and that of the mean signal a3 is due to noise or due to a defective pixel; and wherein the defective pixel correction signal is the mean signal a3.

8. A defective pixel correction apparatus according to claim 7, wherein the mean signal a3 is created by calculating a mean of three highest video signal levels selected from the video signal levels of the peripheral pixels.

9. A defective pixel correction apparatus according to claim 7, wherein the mean signal a3 is calculated by obtaining a mean of four video signal levels of the peripheral pixels.

10. A defective pixel correction apparatus according to claim 6, wherein the means for creating comprises:

arithmetic means for calculating the second judge reference signal through an arithmetic operation $$j = d \times g \times k1 + k2$$

where, d is the video signal level of the pixel selected from the two pixels, g is a value derived from (m1+m2)/(u+s), m1 and m2 are the video signal levels respectively of the pixels above and below the second pixel, u and s are the video signal levels respectively of the pixels above and below the signal selected from the two pixels, k1 is a parameter to determine whether or not a difference between the video signal level of the second pixel and the video signal level d×g calculated using the peripheral pixels is due to difference in contrast or due to a defective pixel, and k2 is a parameter to determine whether or not the difference between the video signal level of the second pixel and the video signal level d×g is due to noise or due to a defective pixel.

11. A defective pixel correction apparatus for use with an imaging device having a solid-state imaging device including a plurality of pixels respectively coated with mutually different color filters, comprising:

a first detection unit which detects whether or not a first pixel is a defective pixel by comparing a video signal level of the first pixel of the solid-state imaging device with a signal level of a first judgment reference signal created from video signal levels of a plurality of peripheral pixels coated with color filters of a color of the first pixel;

a first correction unit which, if the first pixel is a defective pixel, corrects the video signal level of the defective pixel according to a defective pixel correction signal created using the video signal levels of the peripheral pixels;

a selection unit which selects, from two pixels coated with a color filter of a same color as a second pixel covered with a color filter of a different color from the first pixel and are on the same line as and closest to the second pixel, a pixel having a video signal level higher than the other;

a creation unit which creates a second judgment reference signal using video signal levels of pixels above and below the pixel selected from the two pixels, video signal levels of pixels above and below the second pixel, and a video signal level of the pixel selected from the two pixels;

a second detection unit which detects whether or not the second pixel is a defective pixel by comparing a video signal level of the second judgment reference signal with a video signal level of the second pixel; and a second correction unit which, if the second pixel is a defective pixel, corrects the video signal level of the defective pixel using the video signal level of the pixel selected from the two pixels.

12. A defective pixel correction apparatus for use with an imaging device having a solid-state imaging device including a plurality of pixels respectively coated with mutually different color filters, comprising:

a first detection unit which detects whether or not a first pixel is a defective pixel by comparing a video signal level of the first pixel of the solid-state imaging device with a signal level of a first judgment reference signal created from video signal levels of a plurality of peripheral pixels coated with color filters of a color of the first pixel;

a first correction unit which, if the first pixel is a defective pixel, corrects the video signal level of the defective pixel according to a defective pixel correction signal created using the video signal levels of the peripheral pixels;

a first arithmetic unit which creates a mean signal by taking a mean of at least two highest video signal levels selected from the video signal levels of the peripheral pixels;

a second arithmetic unit which conducts for the mean signal an arithmetic operation $$a3 \times k1 + k2,$$

to create the first judge reference signal, where a3 is the mean signal, k1 is a parameter to determine whether or not a difference between the video signal level of the first pixel and that of the mean signal a3 is due to difference in contrast or due to a defective pixel, and k2 is a parameter to determine whether or not the difference between the video signal level of the first pixel and that of the mean signal a3 is due to noise or due to a defective pixel; and wherein the defective pixel correction signal is the mean signal a3.

13. A defective pixel correction apparatus according to claim 12, wherein the mean signal a3 is created by calculating a mean of three highest video signal levels selected from the video signal levels of the peripheral pixels.

14. A defective pixel correction apparatus according to claim 12, wherein the mean signal a3 is calculated by obtaining a mean of four video signal levels of the peripheral pixels.

15. A defective pixel correction apparatus according to claim 11, the creation unit comprises:

an arithmetic unit which calculates the second judgment reference signal through an arithmetic operation $$j = d \times g \times k1 + k2$$

where, d is the video signal level of the pixel selected from the two pixels, g is a value derived from (m1+m2)/(u+s), m1 and m2 are the video signal levels respectively of the pixels above and below the second pixel, u and s are the video signal levels respectively of the pixels above and below the signal selected from the two pixels, k1 is a parameter to determine whether or not a difference between the video signal level of the second pixel and the video signal level d×g calculated using the peripheral pixels is due to difference in contrast or due to a defective pixel, and k2 is a parameter to determine whether or not the difference between the video signal level of the second pixel and the video signal level d×g is due to noise or due to a defective pixel.

* * * * *